United States Patent [19]
Aoki et al.

[11] Patent Number: 5,699,131
[45] Date of Patent: Dec. 16, 1997

[54] LIGHT TRANSMISSION TYPE SCREEN ASSEMBLY

[75] Inventors: Satoshi Aoki, Kadoma; Katsuaki Mitani, Ibaraki, both of Japan

[73] Assignee: Matsushita Electric Industrial Co., Ltd., Osaka, Japan

[21] Appl. No.: 669,953

[22] Filed: Jun. 25, 1996

[30] Foreign Application Priority Data

Jul. 3, 1995 [JP] Japan ................................ 7-167220

[51] Int. Cl.⁶ .................. H04N 5/72; H04N 5/64; G09G 3/00; G03B 21/56
[52] U.S. Cl. .................. 348/832; 348/789; 348/794; 348/59; 348/786; 348/840; 345/32; 359/443; 359/457; 359/456; 359/455; 359/742; 359/819; 359/811; 359/619
[58] Field of Search .................. 348/779, 789, 348/794, 59, 786, 832, 840; 345/32; 359/443, 457, 456, 455, 742, 819, 811, 619

[56] References Cited

U.S. PATENT DOCUMENTS

| | | | |
|---|---|---|---|
| 4,536,056 | 8/1985 | Oguino et al. | 350/128 |
| 4,921,330 | 5/1990 | Takahashi et al. | 350/128 |
| 5,200,854 | 4/1993 | Ogino et al. | 359/451 |
| 5,289,311 | 2/1994 | McClelland et al. | 359/457 |
| 5,611,611 | 3/1997 | Ogino et al. | 359/457 |

FOREIGN PATENT DOCUMENTS

| | | | |
|---|---|---|---|
| 706 077 | 4/1996 | European Pat. Off. | G03B 21/62 |
| 3-108236 | 11/1991 | Japan. | |
| 4-70645 | 6/1992 | Japan. | |
| 4-85886 | 7/1992 | Japan. | |
| 7030912 | 7/1993 | Japan. | |
| 5241110 | 9/1993 | Japan | G02B 27/48 |
| 8107536 | 4/1996 | Japan. | |
| 8179427 | 7/1996 | Japan. | |

OTHER PUBLICATIONS

European Search Report dated Jan. 22, 1997.

*Primary Examiner*—Kim Vu
*Assistant Examiner*—Tia M. Harris
*Attorney, Agent, or Firm*—Ratner & Prestia

[57] ABSTRACT

The present invention provides a screen assembly wherein measures are taken to prevent slack produced in a lenticular lens sheet due to temperature changes and gaps created between a Fresnel lens sheet and the lenticular lens sheet due to temperature changes, thereby enabling the display of images free of inconsistencies in color. The structure of the screen assembly has the lower parts of a lenticular lens sheet and a Fresnel lens sheet comprising a screen fixed together, the upper part of the light radiant side of the lenticular lens sheet fixed to the upper part of a framework, the lower part of the screen, where the Fresnel lens sheet and the lenticular lens sheet are put together not being fixed to the lower part of the framework and a specified clearance created between the lower part of the screen and the lower part of the framework.

4 Claims, 5 Drawing Sheets

LIGHT TRANSMISSION TYPE SCREEN ASSEMBLY

BACKGROUND OF THE INVENTION

A. Field of the Invention

The present invention relates to a light transmission type screen assembly for use in projection type television receivers and the like for magnification and projection of images by means of lenses.

B. Description of the Prior Art

As shown in FIG. 4, a prior art screen device has a structure wherein a screen comprising a lenticular lens sheet 101 and a Fresnel lens sheet 102 is fixed by mounting means.

More specifically, the lenticular lens sheet 101 and Fresnel lens sheet 102 are put together by use of adhesive tapes 109 and the resulting assembly is fixed to a framework 104 by means of mounting hardware (bracket or plate) 105, screws 106 and the like. However, this method of mounting causes the lenticular lens sheet 101 which has a large degree of expansion and contraction due to temperature changes or a large expansion coefficient to become wavy when the lenticular lens sheet 101 and Fresnel lens sheet 102 are pressed on the framework 104 with too much force or pressure, and gaps are created between the lenticular lens sheet 101 and the Fresnel lens sheet 102. In other words, what is called an air gap phenomenon occurs, thereby causing inconsistencies in color in the projected image.

In order to solve the foregoing problems, new structures have been proposed in Japanese Published Unexamined Patent Application Nos. 108236/91, 70645/92 and 85886/92.

These new structures are explained as follows.

FIG. 5 shows the structure as disclosed in the foregoing Published Unexamined Patent Application No. 108236/91. One side of a screen 201 is fixed onto a framework 202 and the opposing side of the screen 201 is fixed by applying a pulling force through jigs 203 in accordance with temperature changes so that creation of air gaps is prevented by pulling the screen 201 constantly.

FIG. 6 shows the structure as disclosed in the foregoing Published Unexamined Patent Application No. 85886/92. Here, instead of the jigs as used in the the device of FIG. 5 to apply a pulling force to the screen, rollers 303 are provided on the side of a screen 301 opposite to the side where the screen 301 is fixed onto a framework 302 by means of mounting hardware 304. When the screen 301 expands or contracts due to temperature changes, the rollers 303 rotate according to the expansion or contraction of the screen 301 and hold the screen firmly, thereby fixing the screen 301 securely onto the framework 302 and at the same time absorbing the expansion and contraction of the screen 302 caused by temperature changes.

FIG. 7 shows the structure as disclosed in Published Unexamined Patent Application No. 70645/92, wherein the upper part of a lenticular lens sheet 401 and a Fresnel lens sheet 402, put together by means of a double-sided adhesive tape 409, are fixed onto a framework 403 by means of mounting hardware 404 and the lower part of the lenticular lens sheet 401 and Fresnel lens sheet 402 are held by squeezing between the framework 403 and the mounting hardware 404, thus bringing the lenticular lens sheet 401 into close contact with the Fresnel lens sheet 402 due to its own weight when temperature changes cause expansion or contraction of the screen.

However, all these structures tend to be rather complicated since jigs to provide a pulling force on the screen and rollers to absorb the expansion or contraction of the screen are required, which tend to be bulky in order to accommodate the jigs and rollers, thus presenting problems for the manufacturer.

Furthermore, the structure according to Published Unexamined Patent Application No. 70645/92 relies on the ability of the lenticular lens sheet 401 to return to its original shape as it expands after it has contracted due to a temperature change. However, when spacing between lenticular lenses of the lenticular lens sheet 401 are very small, the lenticular lens sheet 401 appears to be a plain sheet of film and is very light in weight, thereby causing the recovery to the original shape by its own weight to become uncertain, thus leading to the problem of air gap formation.

SUMMARY OF THE INVENTION

The goal of the present invention is to provide a screen device having a compact structure, whereby images with no inconsistencies in color are realized by preventing a lenticular lens sheet from becoming wavy due to temperature changes and keeping the lenticular lens sheet and Fresnel lens sheet securely in contact with each other.

A first structure for the screen device comprises:

a screen composed of a lenticular lens sheet and a Fresnel lens sheet, the lower part of each being fixed to each other; and a framework with the upper part thereof being fixed to the upper part of the light radiant side surface of the lenticular lens sheet and with the lower part thereof not being fixed to the lower part of the screen, wherein the structure prevents slack in the lenticular lens sheet due to temperature changes from occurring through the weight of the Fresnel lens sheet imposed on the lower part of the lenticular lens sheet.

A second structure for the screen device comprises:

a screen composed of a lenticular lens sheet and a Fresnel lens sheet, both not being fixed to each other; and a light transmissive panel, for mounting the screen put together with the Fresnel lens sheet by means of mounting hardware with a specified clearance left on the light radiant side, and with the lenticular lens sheet hanging freely within the clearance created between the light transmissive panel and Fresnel lens sheet.

DETAILED DESCRIPTION OF THE INVENTION

A few exemplary embodiments of the present invention of a screen device will be explained with the help of drawings.

(Example 1)

Figure 1:
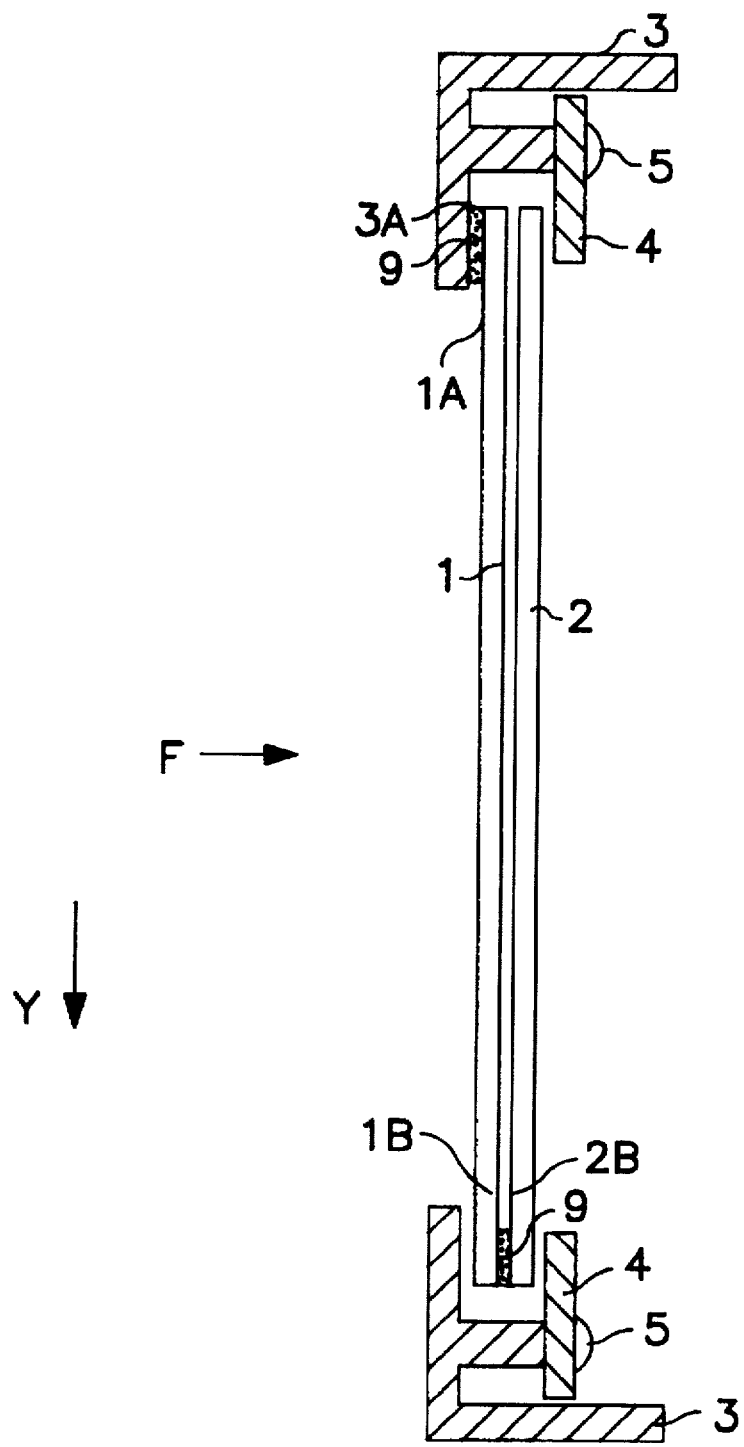
FIG. 1 is a cross-sectional view of a screen device according to a first exemplary embodiment of the present invention.

FIG. 1 is a cross-sectional view of a screen device (assembly) according to a first exemplary embodiment of the present invention.

A screen device according to the present invention comprises a screen consisting of a lenticular lens sheet 1 and a Fresnel lens sheet 2, a framework 3 and mounting hardware 4 that is installed on the light incident side of the Fresnel lens sheet 2 to prevent the screen from becoming disengaged from the framework 3 even when an external force shown by arrow F is applied in a direction normal (perpendicular) to the screen.

The steps needed to assemble the screen device are as follows:

The lower part 1B of the light incident side of the lenticular lens sheet 1 is cemented to the lower part 2B of the light radiant side of the Fresnel lens sheet 2 by means of a double-sided adhesive tape 9 or the like. The upper part 3A of the framework 3 and the upper part 1A of the light radiant side of the lenticular lens sheet 1 are cemented together in a similar manner by means of a double-sided adhesive tape 9.

Then, the mounting hardware 4 is installed on the light incident side of the Fresnel lens sheet 2 and fastened to the framework 3 by means of a fastener such as a screw 5.

Accordingly, the screen constructed of the lenticular lens sheet 1 and Fresnel lens sheet 2 is securely mounted on the framework 3.

At the same time, a clearance is created between the light incident surface of the Fresnel lens sheet 2 and the mounting hardware 4, and also another clearance is created between the lower part of the screen, where the lenticular lens sheet 1 and Fresnel lens sheet 2 are fixed together, and the framework 3.

The screen device thus produced according to FIG. 1 has a clearance between the lower part of the lenticular lens sheet 1 and the framework 3, and the upper part of the light incident side of the lenticular lens sheet 1 is not cemented to the upper part of the light radiant side of the Fresnel lens sheet 2. Therefore, even when the lenticular lens sheet 1 expands or contracts due to temperature changes, it can move freely. In addition, the weight of the Fresnel lens sheet 2 is imposed on the lower part of the lenticular lens sheet 1, thereby a constant pulling force is applied to the lenticular lens sheet 1 in the direction of gravity shown by arrow Y to make the lenticular lens sheet 1 and the Fresnel lens sheet 2 keep in close contact with each other.

Therefore, it becomes possible to obtain stabilized images that are free of inconsistencies in color even when the ambient temperature changes. In particular, no additional space is required for the above described arrangement, and the dimensions of the framework 3 are kept to the minimum requirements needed to house the screen.

(Example 2)

Figure 2:
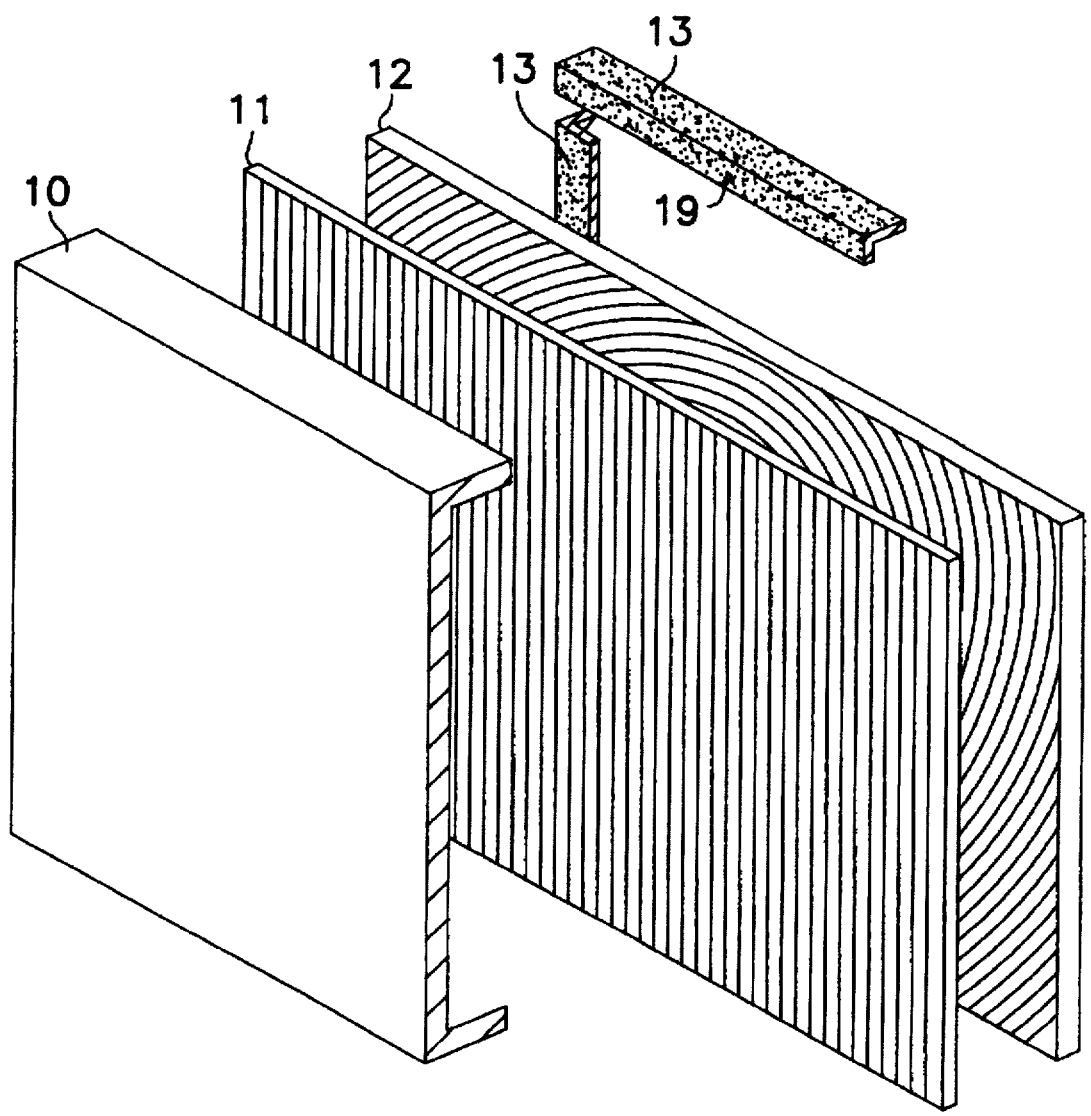
FIG. 2 an exploded perspective view of a screen device according to a second exemplary embodiment of the present invention.
Figure 3:
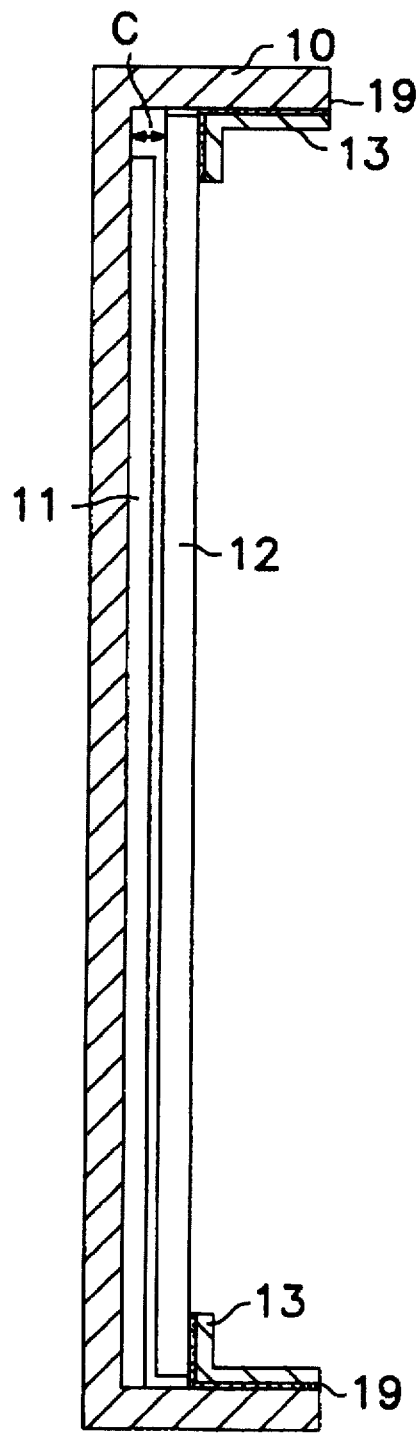
FIG. 3 is a cross-sectional view of the screen device of FIG. 2 after assembly.
Figure 4:
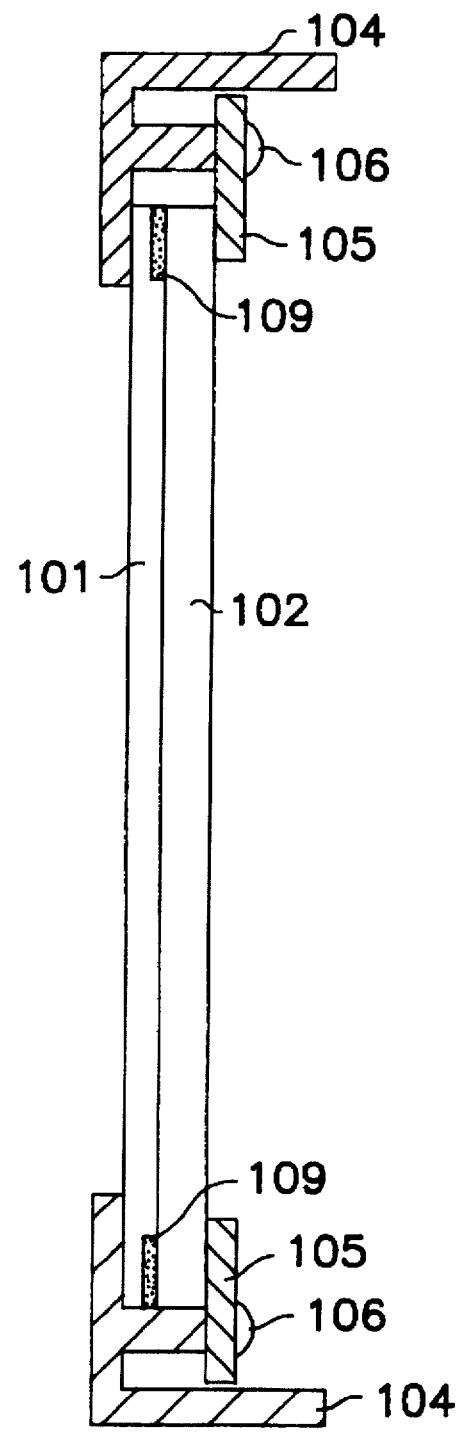
FIG. 4 is a cross-sectional view of a prior art screen device.
Figure 5:
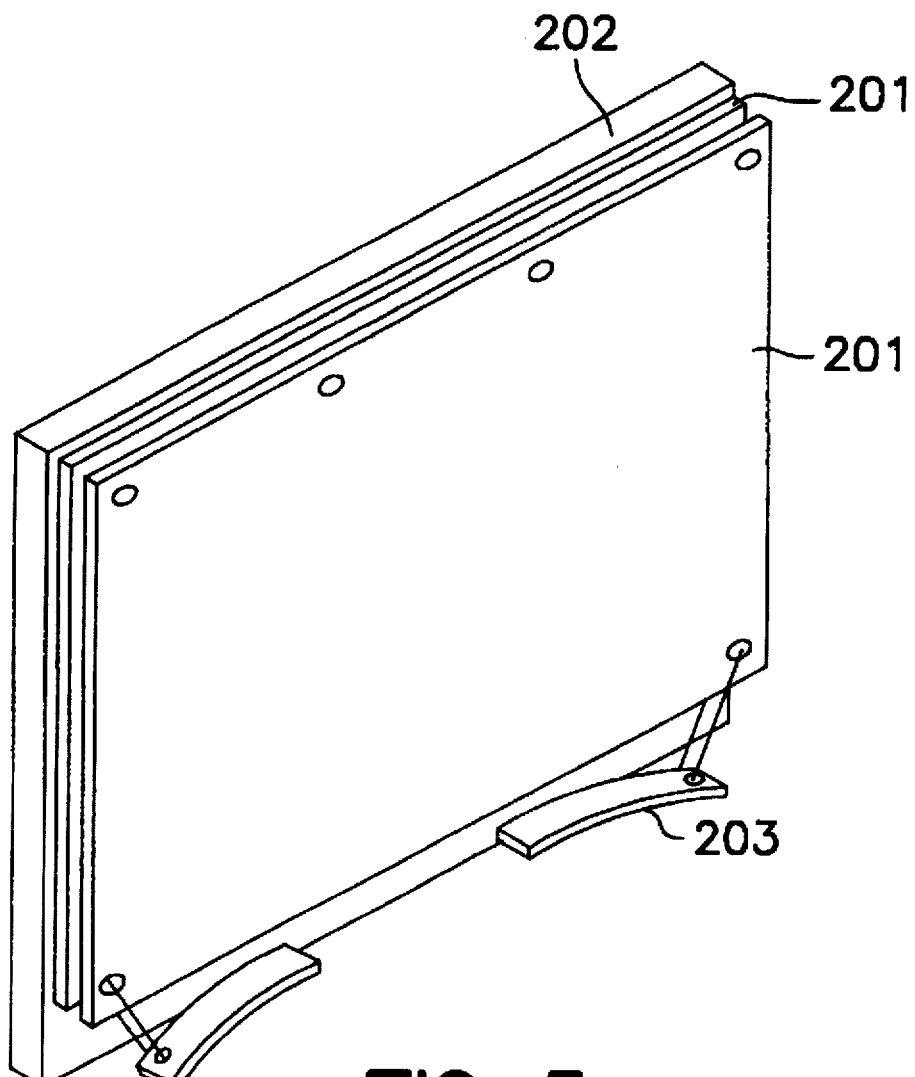
FIG. 5 is a perspective view of a prior art screen device.
Figure 6:
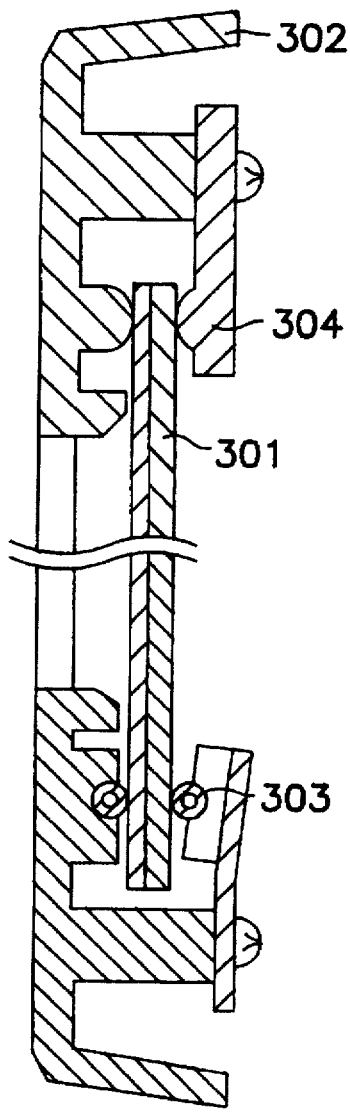
FIG. 6 is a cross-sectional view of a prior art screen device.
Figure 7:
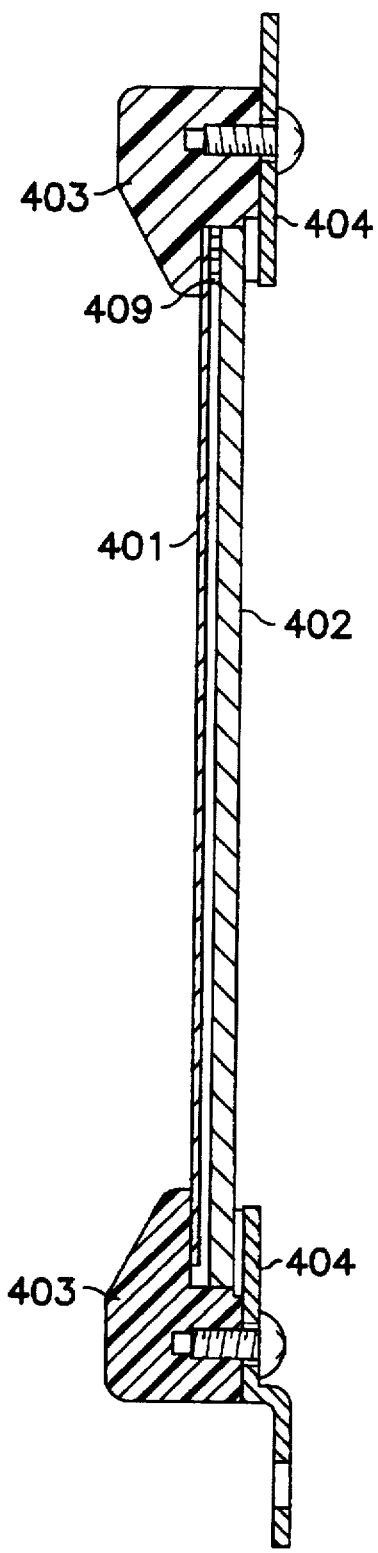
FIG. 7 is a cross-sectional view of a prior art screen device.

FIG. 2 is an exploded perspective view of a screen device according to a second exemplary embodiment of the present invention, and FIG. 3 is a cross-sectional view of FIG. 2 after assembly.

As shown in FIG. 2 and FIG. 3, the screen device of the present invention comprises a light transmissive panel 10 housing a screen composed of a lenticular lens sheet 11 and a Fresnel lens sheet 12; and screen mounting hardware 13 that is used to fix the Fresnel lens sheet 12 onto the foregoing light transmissive panel 10 by means, for example, a double-sided adhesive tape 19 or the like.

In the above structure, it is possible for the lenticular lens sheet 11 to expand or contract freely even when the ambient temperature changes by creating a clearance C which is slightly larger than the thickness T of the lenticular lens sheet 11, between the light transmissive panel 10 and the Fresnel lens sheet 12, and thus there will be no gaps created between the lenticular lens sheet 11 and the Fresnel lens sheet 12 due to partial deformations of the lenticular lens sheet 11. Furthermore, there will be no danger of the lenticular lens sheet 11 becoming disengaged since it is sandwiched between the light transmissive panel 10 and the Fresnel lens sheet 12.

Thus, according to the screen device of the present invention, not withstanding its compactness, it is possible to obtain images that are free of inconsistencies in color by keeping the lenticular lens sheet and Fresnel lens sheet always in close contact with each other to prevent waving of the lenticular lens sheet caused by temperature changes.

What is claimed:

1. A screen assembly comprising:

a screen composed of a lenticular lens sheet and a Fresnel lens sheet; and a framework on which said screen is mounted, wherein the lower part of said lenticular lens sheet and the lower part of said Fresnel lens sheet are fixed together;

the upper part of the light radiant side of said lenticular lens sheet and the upper part of said framework are fixed together;

the lower part of said screen, where the lenticular lens sheet and Fresnel lens sheet are fixed together are not held by the lower part of said framework; and a specified clearance is created between said screen except for the area where the upper part of the light radiant side of said lenticular lens sheet and framework are fixed together.

2. A screen assembly comprising:

a screen composed of a lenticular lens sheet and a Fresnel lens sheet; and a light transmissive panel on which said screen is mounted wherein said lenticular lens sheet is disposed between said light transmissive panel and said Fresnel lens sheet, a first end of said Fresnel lens sheet is fixed to a second end of said light transmissive panel, at least one of a) a first distance between said lenticular lens sheet and said light transmissive panel, and b) a second distance between said lenticular lens sheet and said Fresnel lens sheet, and said lenticular lens sheet is detached from said light transmissive panel and said Fresnel lens sheet.

3. A screen assembly of claim 2, wherein said light transmissive panel is a box type having an opening, and said screen is mounted in said box type of said light transmissive panel.

4. A screen assembly of claim 2, wherein at least one of said first distance and said second distance is greater than zero.

* * * * *